EFFECT OF THERMAL TREAT TEMPERATURE ON ACTIVITY OF STEAMED CATALYSTS

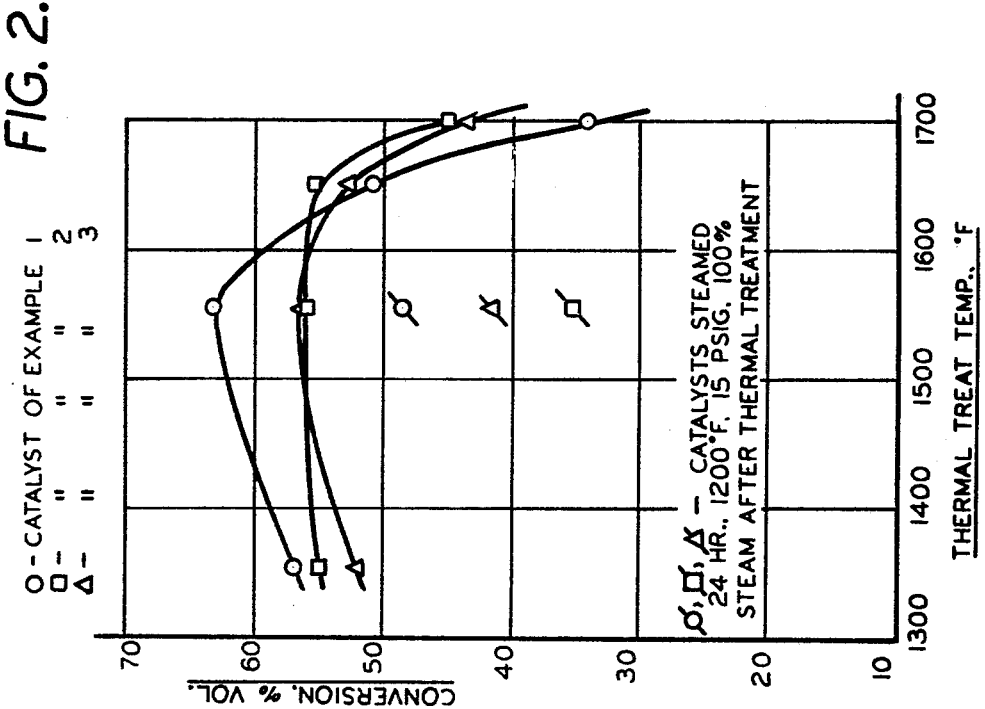
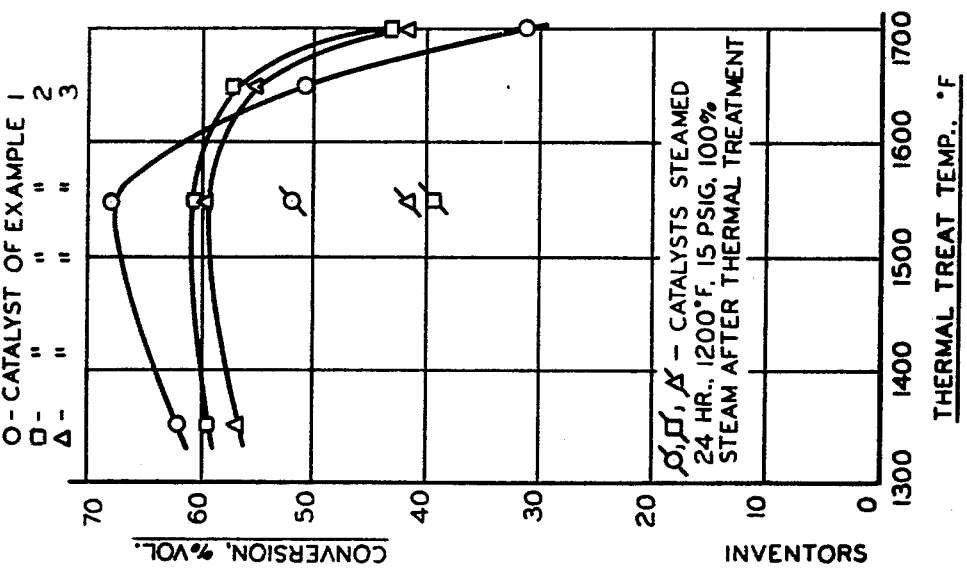

(DATA CORRECTED TO 0.2 SEVERITY FACTOR)

- O — CATALYST OF EXAMPLE 1
- □ — " " " 2
- △ — " " " 3

EFFECT OF THERMAL TREAT TEMPERATURE ON ACTIVITY OF STEAMED CATALYSTS

- O — CATALYST OF EXAMPLE 1
- □ — " " " 2
- △ — " " " 3

INVENTORS
FRANCIS G. DWYER
WILLIAM A. STOVER

ATTORNEY.

United States Patent Office 3,393,147
Patented July 16, 1968

3,393,147
CATALYSTS HAVING IMPROVED THERMAL STABILITY AND METHOD OF PREPARING THE SAME
Francis G. Dwyer, Cherry Hill, and William A. Stover, Woodbury, N.J., assignors to Mobil Oil Corporation, a corporation of New York
Filed Mar. 2, 1966, Ser. No. 531,141
8 Claims. (Cl. 208—120)

ABSTRACT OF THE DISCLOSURE

A method of preparing a fluid catalyst. Process involves precipitating a siliceous oxide gel at an acidic pH, drying the gel in the form of finely divided particles, and thermally treating the finely divided product, with the improvement of steaming the finely divided product prior to the thermal treatment, results in catalyst having improved resistance to loss of catalytic activity and selectivity from the thermal treatment.

---

This invention relates to the catalytic conversion of hydrocarbon oils into lower normally liquid and normally gaseous products, to an improved catalyst for effecting this conversion, and to a method for preparing such improved catalyst. In one embodiment, the invention relates to improved cracking catalysts comprising an inorganic oxide gel or comprising a rare earth aluminosilicate zeolite dispersed in an inorganic oxide gel matrix, which catalysts are characterized by improved thermal stability as well as by desirable activity and selectivity. In another embodiment, the invention is directed to a method for making these catalysts, and for utilizing such catalysts in the catalytic cracking of heavy petroleum fractions to lighter materials boiling in the gasoline range.

Recently it has been recognized that composite catalysts especially suitable for use in the fluid catalytic cracking of hydrocarbon oils may be produced by forming a silica-alumina gel matrix by precipitating alumina gel on silica gel, desirably at an acidic pH (e.g., a pH of from about 4 to 5), depositing in the gel matrix very fine particles of an aluminosilicate zeolite carrying rare earth metal cations (hereafter called "rare earth zeolite"), and drying the resulting mixture, as by spray-drying, in the form of particles of a size suitable for use as a fluidized catalyst. Similar catalysts may also be produced by forming a silica-zirconia matrix (rather than a silica-alumina matrix), depositing finely divided rare earth zeolite in such matrix, and drying as finely divided particles.

The rare earth zeolite component in the foregoing composite catalysts is believed to significantly enhance their activities. Fluid type catalysts containing no rare earth zeolite component are, of course, also recognized as valuable in the petroleum industry, although their activities are relatively lower. Such catalysts may be prepared in a manner similar to that employed in making the foregoing composite catalytsts, except that the step of depositing fine particles of rare earth zeolite in the gel matrix is omitted.

The foregoing dried catalysts are desirable in that they will attain selective catalytic properties subjected to thermal treatment, e.g., as by adding to a commercial fluid cracking unit on a make-up basis.

According to one aspect of this invention, we have found that the thermal stability and selectivity of "composite" catalysts (comprising a rare earth zeolite dispersed in an inorganic oxide gel matrix, e.g., a silica-metal oxide matrix) and of "homogeneous" catalysts (made up of inorganic oxide gel matrix but not containing a rare earth zeolite disperse phase) are improved if the catalyst, prior to thermal treatment is subjected to steaming, e.g., for about 24 hours at 1200° F. with 15 p.s.i.g. steam. It appears that this preliminary steaming converts small thin walled pores to larger thicker walled pores which are markedly more resistant to sintering during a subsequent thermal treatment. Accordingly, there is less reduction in pore volume than would occur in the absence of such initial steaming, so that the catalytic activity and selectivity are superior to those which would be exhibited by a catalyst that was not preliminarily steamed.

Our invention will be best understood by a consideration of the following detailed description taken in conjunction with the accompanying drawings wherein:

FIG. 1 is a graph of percent conversion as against temperature of thermal activation for fluid catalysts not subjected to an initial steaming treatment, the data plotted having been corrected to a severity factor of 0.2;

FIG. 2 is a plot similar to that of FIG. 1, the data having not been corrected to a 0.2 severity factor;

Figure 4:
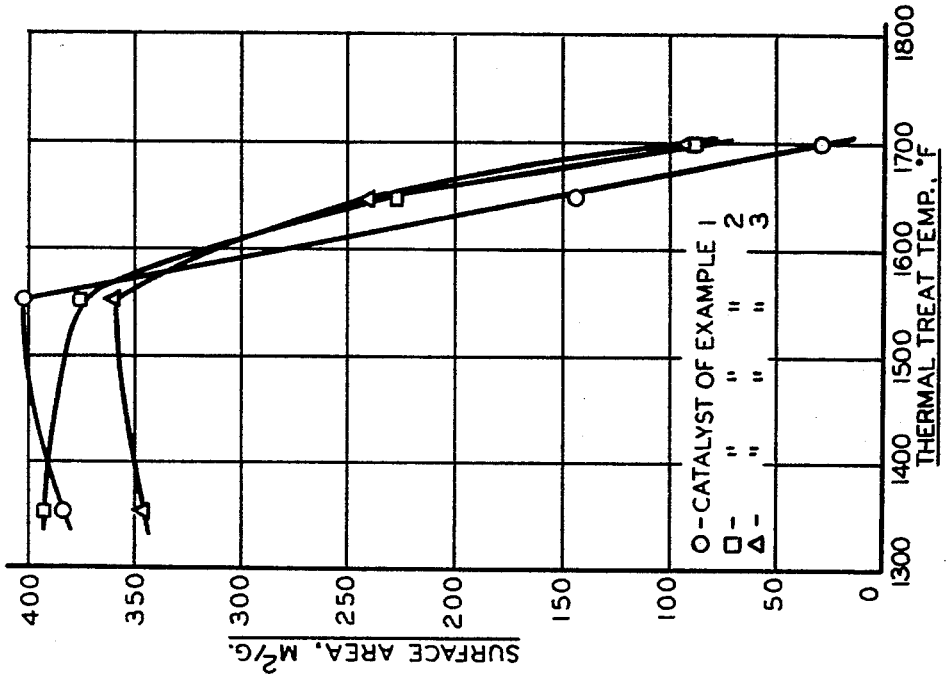
FIG. 4 is a plot of surface area as against thermal activation temperature for fluid catalysts not subjected to an initial steaming treatment, the data plotted having been corrected to a severity factor of 0.2.

Considering first the preparation of composite catalysts to be employed in the method of this invention, the rare earth zeolite used in making such composite catalysts is an aluminosilicate composition containing rare earth metal cations as a result of treatment with a fluid medium containing at least one rare earth metal cation. Rare earth metal salts represent the source of rare earth cation. The product resulting from treatment with a fluid medium is an activated crystalline and/or amorphous aluminosilicate in which the structure thereof has been modified primarily to the extent of having the rare earth cations chemisorbed or ionically bonded thereto.

In preparing the composite catalyst compositions of this invention, the aluminosilicate can be contacted with a nonaqueous or aqueous fluid medium comprising a gas, polar solvent or water solution containing at least one rare earth metal salt soluble in the fluid medium.

Water is the preferred medium for reasons of economy and ease of preparation in large scale operations involving continuous or batchwise treatment. Similarly, for this reason, organic solvents are less preferred but can be employed providing the solvent permits ionization of the rare earth metal salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate; alcohols such as ethanol, propanol, butanol, etc.; and miscellaneous solvents such as dimethylformamide, and the like.

The rare earth cation may be present in the fluid medium in an amount varying within wide limits depending upon the pH of the fluid medium. Where the aluminosilicate material has a molar ratio of silica to alumina greater than about 5.0, the fluid medium may contain a rare earth cation equivalent to a pH value ranging from less than 1.0 up to a pH value of about 12.0. Within these limits, pH values for fluid media containing a rare earth cation range from 3.5 to 10.0 and are preferably between a pH value of 4.5 and 8.5. Where the molar ratio of silica to alumina is greater than about 2.2 and less than about 5.0, the pH value for fluid media containing a rare earth cation ranges from 3.8 to 8.5. Thus, depending upon the silica to alumina ratio, the pH value can vary within rather wide limits.

In carrying out the treatment with the fluid medium, the procedure employed varies depending upon the particular aluminosilicate which is treated. If the aluminosilicate which is treated has alkali metal cations associated therewith, e.g., Zeolite X, then the treatment with the fluid medium or media should be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium is substantially free of alkali metal cations, i.e., a calcium aluminosilicate, then the treatment need not be carried out until such time as the metal is exhausted since the presence of metals other than alkali metals does not seriously limit catalytic properties.

Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate.

Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of a correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous or nonaqueous solution may be passed slowly through a fixed bed of aluminosilicate. If desired, hydrothermal treatment or corresponding nonaqueous treatment with polar solvents may be effected by introducing the aluminosilicate and fluid medium into a closed vessel maintained under autogeneous pressure. Similarly, treatments involving fusion or vapor phase contact may be employed.

A wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth cloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture or rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Aluminosilicates which are treated with a fluid medium or media in the manner above described include a wide variety of aluminosilicates both natural and synthetic which have an amorphous, crystalline or combination of crystalline and amorphous structure. However, it has been found that exceptionally superior catalysts can be obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

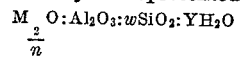

$$M_{\frac{2}{n}}O:Al_2O_3:wSiO_2:YH_2O$$

wherein M represents at least one cation which balances the electrovalence of the tetrahedra, $n$ represents the valence of the cation, $w$ the moles of $SiO_2$ and Y the moles of $H_2O$. The cation can be any or more of a number of metal ions, depending upon whether the aluminosilicate is synthesized or occurs naturally. Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the aluminosilicates are included Zeolites A, Y, L, D, R, S, T, Z, E, F, Q, B, X, levynite, dachiarite, erionite, faujasite, analcite, paulingite, noselite, phillipsite, brewsterite, flakite, datolite, chabazite, gmelinite, leucite, scapolite, mordenite as well as certain caustic treated clays such as montmorillonite and kaolin families. The preferred aluminosilicates are those having pore diameters of at least about 4 Angstroms.

Particularly preferred rare earth zeolites for use in this invention may be made by base exchange of sodium zeolite X with rare earth ions to form rare earth zeolite X (see, e.g., Plank et al. U.S. Patent 3,140,249, Example 26), and by base exchange of sodium zeolite Y with rare earth ions to form rare earth zeolite Y (see, e.g., Plank et al. application Ser. No. 195,945, filed May 18, 1962, entitled, "Catalyst and Conversion of Organic Compounds in the Presence Thereof.")

Other synthesized crystalline aluminosilicates include those designated as ZK–4, Zeolite A and ZK–5.

Other aluminosilicates which can be used are caustic treated clays.

Of the clay materials, montmorillonite and kaoline families are representative types which include the sub-bentonites, such as bentonite, and the kaolins commonly identified as Dixie, McNamee, Georgia and Florida clay in which the main mineral constituent as halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O/Na_2O$ (mole ratio) | 35–100 to 1 |

It is to be understood that mixtures of the various aluminosilicates previously set forth can be employed as well as individual aluminosilicates.

As has been previously pointed out, the rare earth zeolites are aluminosilicates containing rare earth metal cations. In no instance should there be any more than 0.25 equivalent per gram atom of aluminum of alkali metal associated with the aluminosilicate.

Within the above limits it is preferred that there be a minimum amount of alkali metal cations associated therewith since the presence of these metals tends to suppress or limit catalytic properties, the activity of which, as a general rule, decreases with increasing content of alkali metal cations. It is also preferred that the novel compositions have at least 0.4 and more desirably 0.6 to 1.0 equivalent per gram atom of aluminum of positive ions of which at least some are rare earth metal cations. Additionally, in those situations wherein the catalyst composition contains metallic cations other than rare earth metal cations, it is then preferred that they be at least divalent with the cations of divalent metals, such as calcium, magnesium, and manganese being particularly advantageous. Polyvalent metallic ions capable of reduction to lower valence states are also particularly advantageous for dual function catalysts.

It is most preferred to use rare earth zeolite compositions which have from 0.5 to 1.0 equivalent per gram atom of aluminum of rare earth metal cations. Thus, in such instance rare earth metal cations are substantially the only metallic cations associated with the aluminosilicate.

While not wishing to be bound by any theory of operation, it nevertheless appears that the rare earth cations tend to impart stability to the aluminosilicate compositions, thereby rendering them far more useful for catalytic purposes, particularly in hydrocarbon conversion processes such as cracking.

The incorporation of the rare earth cations into the zeolite by base-exchange is advantageously effected before the zeolite particles are brought into contact with the matrix.

After the rare earth zeolite has been blended with the matrix and dried, the resulting composite is advantageously given a wet treatment to remove the residual alkali-metal ions (which may for example, be present, at this stage in amount of about 1 to 5%, and more usually from about 1 to 3%, based on the zeolite) by further base exchange with materials capable of providing hydrogen ions.

The efficiency of this subsequent treatment is greatly improved if the rare earth zeolite, in finely divided condition is pretempered by subjecting it to dehydrating conditions, as by calcination, to lower its residual moisture content to a value within the range of 0.3 to 6%, more preferably within the range of 1.5 to 6%, such pretempering being effected before the rare earth zeolite is brought into contact with the matrix. As a result of this pretempering the rare earth zeolite can be later exchanged to a lower sodium content much more easily, it becomes more resistant to loss of crystallinity on contact with acidic media, and the relative crystallinity of the final product is higher. In addition, the rare earth component becomes more fixed in the crystalline aluminosilicate and more resistant to removal on subsequent base exchange.

Suitable pretempering conditions are, for example, a temperature of about 650° F. in air for about 60 minutes or a temperature of about 1500° F. in air for about 10 minutes, or a treatment with superheated steam at about 1100–1200° F. at 15 p.s.i.g. for from about 10 to 60 minutes; a preferred treatment is at atmospheric pressure at a temperature of about 1050–1250° F. in steam, air, or a steam-air mixture for from about 10 to 60 minutes. (This pretempering technique is described more fully in U.S. application Ser. No. 459,687, filed May 28, 1965, entitled "Improved Crystalline Aluminosilicate and Method of Preparing Same.")

The mean particle size of the rare earth zeolite incorporated into the matrix is advantageously less than about 40 microns. Preferably the particle size is in the range of about 2 to 20 microns, and most preferably from about 2 to 10. The pore openings of the rare earth zeolite are uniform, generally at least 6 Angstrom units in diameter, preferably about 6 to 15 Angstrom units in diameter.

The fine particles of rare earth zeolite are conveniently slurried in a liquid medium, preferably an aqueous liquid, before adding them to the matrix to form the composite catalyst.

As previously noted, this invention is concerned not only with composite catalysts made as described previously, but also with "homogeneous" catalysts which do not contain a disperse phase of rare earth zeolite. Such homogeneous catalysts comprise the "matrix" (for the rare earth zeolite) but do not, of course, contain the rare earth zeolite.

The inorganic oxide gel matrix, e.g., silica-alumina matrix, into which the rare earth zeolite may or may not be deposited, is advantageously prepared by precipitating the silica from an aqueous alkaline solution, as by means of a mineral acid, preferably using a limited amount of acid so as to reduce the pH but still leave the mixture mildly alkaline, then adding an aqueous solution of an aluminum salt in which the aluminum exists in the anion (e.g., sodium or calcium aluminate) to the resulting slurry, and then adding an aqueous solution of an aluminum salt in which the aluminum is present in the cation (e.g., aluminum sulfate or chloride), thus lowering the pH to about 4–5 and impregnating the silica gel with alumina precipitated from both of the added aluminum salts. These reactions may be carried out in the presence of sequestering agents such as aldonic acid or aldonate.

Suitable methods for making such a matrix are described in Ashley U.S. Patent 2,701,793, Winyall U.S. Patent 2,886,512, Secor et al. U.S. Patent 2,935,463, and a particularly suitable method in Braithwaite U.S. Patent 2,941,961.

Where a silica-alumina matrix is employed, best results are obtained when gelled alumina content of the matrix (on a dry basis) does not exceed about 25% and preferably does not exceed about 13%.

It is to be noted that this invention contemplates the use of silica-zirconia gel, silica-zirconia-alumina gel, or silica gel (instead of a silica-alumina gel), with or without the rare earth zeolite as the disperse phase. Accordingly, although the discussion may refer specifically to silica-alumina gel, it is generally also relevant with respect to the other gels referred to above. Where a silica-zirconia-alumina gel is employed, the gelled alumina content desirably should not exceed about 25% and the gelled zirconia should not exceed about 10%. For a silica-zirconia matrix the gelled zirconia content should not exceed about 25%.

The matrix is advantageously prepared in such a manner that, as charged to the cracking unit, it has a pore volume in the range of from about 0.5 to 1.2 cc./g., and preferably from about 0.7–1.00 cc./g. The average pore diameter should desirably be in excess of about 60 Angstroms and should not exceed about 250 Angstroms, and preferably should be from about 80 to 200 Angstroms. (A detailed discussion of how average pore diameter is determined is given in the text edited by P. H. Emmett and entitled "Catalysts, volume I," at page 56, 1954 ed., Reinhold Publishing Corp., New York. See also Eastwood et al. U.S. Patent 3,161,488.)

Increase in pore size increases the effective diffusivity of the resulting catalyst. Also the increase in pore size gives a material which is a more effective cracking catalyst, particularly with heavy gas oils (e.g., oils having a boiling point range of from about 650 to 1050° F.) and wide cut gas oils having a boiling point range of from about 400 to 1000° F. Catalysts made with the large pore size matrices also have longer effective lives and are more resistant to sintering and resistant to decrease in their effective diffusivity with continued use.

The porosity of the matrix can be adjusted so as to obtain the desired pore volume according to prior art techniques. Thus, increased porosity may be obtained by (1) increasing the time and temperature of aging of the silica gel, (2) increasing the silica content during the formation of the silica gel, raising the pH during aging to from about 5.5 to 7.5. For a more detailed discussion of such prior art techniques for adjusting porosity, see "Control of Physical Structure of Silica-Alumina Catalyst" by Ashley et al., vol. 44, Industrial And Engineering Chemistry, at pages 2861–2863 (December 1962).

The matrices having larger pores are generally less dense than those in which the pore size is smaller. If desired, the density of the final catalyst can be increased by the addition of high density weighting agents, e.g., finely divided alpha alumina, mullite, zircon ore or the like, in amounts for example, of from about 10 to 60% based on the weight of the matrix, and more preferably from about 30 to 40%. These heavy fines desirably are added to the sodium silicate forming solution.

The matrix may, of course, also contain other components, such as kaolin type clays in amounts, for example, of from about 10 to 60%, and more preferably from about 30 to 40%; based on the weight of the matrix.

If a rare earth zeolite is to be dispersed in the matrix, then at the time that the zeolite is brought into contact with the matrix, the latter is preferably present as a freshly precipitated aqueous slurry. The concentration of the matrix in the slurry may be, for example, in the range of about 1 to 15%. As stated previously, the rare earth zeolite is also preferably in slurry form. Its concentration in its slurry may, for example, be in the range of about 1 to 40%.

Advantageously, the amount of rare earth zeolite in the slurry is sufficient to provide a concentration of this component, in the finished catalyst, in the range of about 2 to 60%, and preferably about 2–10%.

As previously indicated, in making the composite catalyst the particles of rare earth zeolite are dispersed in the matrix, as by a thorough mixing of the rare earth zeolite slurry with the slurry of matrix. Alternatively, the finely divided rare earth zeolite may be added to one of the forming solutions used in preparing the matrix, such as, e.g., to an aluminum sulfate solution or to a sodium aluminate solution. In such case, however, it is desirable that the rare earth zeolite fines should have initially been subjected to pretempering and the residence time of such fines in such forming solution should not exceed about three hours so as to prevent any loss in crystallinity.

In one preferred process, initial slurries of rare earth zeolite and of matrix are thoroughly blended, as by pumps and paddles. It is then desirable to filter the blend. Filtration increases the total solids concentration of the blend to over 8%, e.g., typically from about 10 to 15%, and also removes dissolved salts. If the catalyst is to contain no rare earth zeolite component, then the slurry of silica-metal oxide gel is filtered in similar fashion to increase solids content as above.

The filtered material is then subdivided and dried to form the desired particles. A particularly good method of making microspherical particles (e.g., of particle size of about 1 to 200 microns, the bulk of which are in the range of about 40 to 90 microns) especially suitable for use in fluidized catalytic cracking, is spray drying, preferably under high pressures, e.g., of the order of from about 1000 to 2000 p.s.i.g.

The spray drying temperature is ordinarily within the range of 200° F. to 1000° F. The temperature used will depend upon such factors as the quantity of material to be dried and the quantity of air used in the drying. The temperature of the particles which are being dried is preferably within the range of 150° F. to 300° F. at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-countercurrent drying.

As previously mentioned, after the dried particles have been formed they are preferably given a wet treatment to further remove alkali metal. One suitable technique for this purpose is to treat the particles with a solution of ammonium sulfate, e.g., with water containing about ½–10%, preferably about 1–4%, of ammonium sulfate to remove sodium ions, and then to wash the particles with water. A series of alternating ammonium sulfate and water treatments may be used, ending with a wash with ammonia water (e.g., at a pH of 7–8.5) to remove sulfate ions. The particles are then dried in any suitable manner, as by flash drying.

By virtue of the foregoing wet treatment of the dried particles, e.g., with aqueous alkali metal ammonium sulfate, to further remove alkali metal from the matrix (and zeolite, if present) ammonium ions are introduced. Upon subsequent drying, ammonia is liberated leaving hydrogen ions, so that where the zeolite is present, it contains both rare earth metal cations and hydrogen ions, thus resulting in a catalyst, having highly desirable characteristics.

Where the finished catalyst is of the composite type, it is characterized by a residual sodium content not in excess of about 0.2 weight percent, expressed as $Na_2O$, based upon the weight of the dried catalyst. Indeed, a catalyst having a residual sodium content not in excess of about 0.1 weight percent $Na_2O$ may readily be attained, and where the dispersed rare earth zeolite is of the X form (as contrasted to rare earth zeolite Y) a residual sodium level not in excess of about 0.05 weight percent $Na_2O$ may conveniently be achieved. Where the catalyst is made up solely of matrix and contains no rare earth zeolite component, a residual sodium level not in excess of about 0.03 weight percent $Na_2O$ may readily be attained.

As previously noted, the art has recognized that fluid catalysts of the foregoing type, whether "composite" or "homogeneous," could be rendered catalytically active by thermal treatment. Typically, such thermal treatment is effected by calcining. The thermal treatment may conveniently be effected by adding the fluid catalyst as make-up to a fluid catalytic cracking unit. Thus, after a few of the cracking-regeneration cycles, the catalyst will readily attain some degree of selectivity. Alternatively, the thermal treatment may be carried out by calcining, e.g., in air (and in fluidized condition) at a temperature of from about 1100 to 1400° F. for from about 3 to 16 hours at atmospheric pressure. Of course, the higher the temperature of thermal treatment, the less time required at such temperature. For instance, at a temperature of about 1400° F. only about three hours may be required, whereas at a temperature of about 1100° F. a time of up to about 16 hours may be required. It is to be noted that this thermal treatment is relatively mild as compared to the initial steaming which precedes it.

We have found that when, prior to the thermal treating step, catalysts of the foregoing type are subjected to initial steaming they then exhibit a markedly improved thermal stability. Thus, when the foregoing catalysts are first steamed, then thermally activated, and then tested for catalytic activity, their catalytic performance, as compared to similar catalysts which are thermally activated *without* prior steaming, shows a markedly higher percent conversion. In addition, a comparison of the performance of catalysts initially steamed and then thermally activated with that of similar catalysts first thermally activated and then steamed shows the former to be superior in catalyst selectivity, e.g., a higher yield of $C_5$'s plus gasoline.

The initial steaming step which characterizes the present invention is desirably carried out at a temperature of from about 900 to 1500° F. for from about one-half to 48 hours using at least 80% steam at a pressure of from about zero to 30 p.s.i.g. Preferred conditions utilize a temperature of about 1200 to 1450° F. for from about 2 to 12 hours with 100% steam at from zero to 15 p.s.i.g. Particularly preferred conditions utilize a temperature of from about 1300 to 1425° F. with 100% steam at zero to 5 p.s.i.g. for from about 2 to 4 hours. Of course, the more severe the steaming conditions, the less time required at such conditions in order to impart the desired thermal stability and selectivity to the catalyst.

The foregoing initial steam treatment in advantageous not only as regards improving the resistance of such catalyst to loss of catalytic activity during the subsequent thermal treatment, but also as regards later regeneration of the catalyst once it has become laden with coke and other accumulated deposits. Thus, such regeneration is characteristically effected by heating the spent catalyst in air. Such regeneration is ordinarily carried out at temperatures of from about 1000 to 1350° F. and for a time of from about 5 to 20 minutes and a pressure of from about 11 to 30 p.s.i.g. These conditions, while favorable to removal of coke and other deposits, are disadvantageous in that they tend to reduce both the activity and the selectivity of the catalyst. By virtue of the initial steam treatment in accordance with the present invention, it has been found that the thus treated catalyst is better able to withstand the conditions ordinarily employed to effect regeneration. Although there does occur a decrease in catalytic activity and selectivity from such regeneration, these decreases are significantly less than would occur with a catalyst that had not been subjected to the initial steam treatment which characterizes the present invention.

The following examples are given to further illustrate the invention.

EXAMPLE 1

An aqueous slurry of 4% of freshly precipitated silica-alumina matrix, having a pH of 5 and a temperature of 100° F., was prepared in accordance with the procedure set forth in U.S. Patent 2,941,961, using such proportions of aluminum salt as to provide 87% of silica and 13% alumina as a matrix having an average pore volume, when dried, of 0.90 cc./g.

To the freshly prepared slurry of the silica-alumina matrix there was added a slurry of finely divided rare earth zeolite X (REX). The rare earth zeolite was a synthetic crystalline aluminosilicate zeolite X containing 24.5 weight percent rare earth (expressed as rare earth oxide) and 1.6 weight percent sodium. (Prior to forming the slurry of rare earth zeolite X, the rate earth zeolite X had been pretempered. This was effected by heating in a steam-air mixture at a temperature of 1200° F. for 13 minutes.) The rare earth zeolite X slurry contained about 30% of the finely divided rare earth zeolite, the balance being water. It was added to the freshly precipitated silica-alumina slurry in such quantity as to provide 7.5% of the rare earth zeolite based on the dried weight of the rare earth zeolite-silica-alumina composite. The blend of slurries, at a temperature of about 110° F. and a pH of 5, was thoroughly mixed by paddles and then filtered to produce a filter cake. The cake was spray dried (inlet gas temperature about 1000° F.) to produce microspheres of from about 1 to 140 microns in diameter, with an average particle size of about 62 microns.

The spray dried particles were then treated with a 4% aqueous solution of ammonium sulfate at 90° F. for 2 minutes, then washed with water at 90° F. for 2 minutes. This cycle was repeated 2 times. The product was finally washed with ammonia water at a pH of 7.2 and a temperature of 90° F. for 2 minutes to remove sulfate ions, and then flash dried at an inlet temperature of about 1000° F. and an outlet temperature of about 300° F. to produce a dried microspheroidal product. This product was then slugged and sized to 4–10 mesh.

EXAMPLE 2

The procedure describe in the first paragraph of Example 1 was repeated to thereby provide 87% silica and 13% alumina in a matrix slurry, the matrix having a pore volume, when dried, of 0.90 cc./g.

The slurry was filtered to produce a filter cake, which was spray dried (inlet gas temperature about 1000° F.) to produce microspheres of from about 1 to 140 microns in diameter, with an average particle size of about 62 microns. This was followed with ammonium sulfate exchange and flash drying as described in Example 1.

The product was then slugged and sized to 4–10 mesh.

EXAMPLE 3

The procedure of Example 2 was repeated, the sole exception being to adjust the proportions of aluminum salt to provide a matrix of 75% silica and 25% alumina.

EXAMPLES 4–6

The catalysts of Examples 1–3 were each divided into five portions, all of which were subjected to thermal treatment directly, that is, without a prior initial steam treatment. The thermal treatment was carried out by heating the catalyst in air for 3 hours at temperatures of 1350° F. (one portion), 1550° F. (two portions), 1650° F. (one portion) and 1700° F. (one portion). Thereafter the catalysts thermally treated at each of the four temperatures were tested for catalytic activity. (A second portion treated at 1550° F. was steamed before testing for catalytic activity, as more fully described hereinafter.) Vapors of a wide-cut mid-continent gas oil (having a boiling range of 450–919° F. at 95%) were passed through fluidized beds of each catalyst at a cracking temperature of about 900° F., a catalyst to oil volume ratio of 1.5:1, and a liquid hourly space velocity of 4. The results are summarized in Table 1.

In order to ascertain the effect of steam treatment upon catalyst yield and selectivity, the second portion catalyst that had been thermally activated by heating at 1550° F. in air for 3 hours was then steamed for 24 hours at 1200° F. with 100% steam at 15 p.s.i.g. The so steamed catalyst was then evaluated for catalytic performance as described previously. These results are also summarized in Table 1.

vided into four portions. Each portion was subjected to an initial steaming treatment for 24 hours at 1200° F. with 100% steam at 15 p.s.i.g. Thereafter the four portions of each catalyst were thermally treated by heating for 3 hours in air at temperatures of 1350, 1550, 1650 and 1700° F. The so-steamed and then thermally treated catalysts were each evaluated for catalytic performance by the procedure described in Examples 4–6. The results are summarized in Table 2.

Inasmuch as the catalysts employed in Examples 4–9 were all charged to the cracking unit on a constant volume basis, the weight of the catalysts varied (generally between about 40 and 120 grams). In order to compare the catalysts on an equal weight basis, the conversions were ad-

TABLE 1

| | Catalyst of Example 1: 7.5% REX, 92.5% silica-alumina matrix | | | | Catalyst of Example 2: 87% silica, 13% alumina | | | | Catalyst of Example 3: 75% silica, 25% alumina | | | |
|---|---|---|---|---|---|---|---|---|---|---|---|---|
| Pretreatment | Spray Dried | | | | Spray Dried | | | | Spray Dried | | | |
| Thermal Treatment, 3 hrs. (° F.) | 1,350 | 1,550 | 1,650 | 1,700 | 1,350 | 1,550 | 1,650 | 1,700 | 1,350 | 1,550 | 1,650 | 1,700 |
| Physical Properties: | | | | | | | | | | | | |
| Packed Density, g./cc | 0.41 | 0.43 | 0.66 | 1.00 | 0.43 | 0.42 | 0.54 | 0.80 | 0.41 | 0.46 | 0.52 | 0.80 |
| Pore Volume, cc./g | 1.00 | 0.97 | 0.46 | 0.29 | 1.04 | 1.15 | 0.47 | 0.34 | 1.10 | 0.96 | 0.81 | 0.32 |
| Surface Area, m.²/g | 383 | 404 | 145 | 31 | 393 | 377 | 228 | 88 | 347 | 361 | 211 | 93 |
| Crystallinity, Percent | 8.9 | 9.3 | <0.3 | | | | | | | | | |
| Catalytic Results: | Δ¹ | Δ¹ | Δ¹ | Δ¹ | Δ¹ | Δ¹ | Δ¹ | Δ¹ | Δ¹ | Δ¹ | Δ¹ | Δ¹ |
| Conversion, Percent vol | 56.9 | 63.2 | 50.9 | 34.3 | 55.0 | 56.1 | 55.4 | 45.2 | 52.0 | 56.2 | 52.8 | 43.7 |
| C₅+Gaso., Percent vol | 44.6 +3.8 | 49.4 +5.3 | 44.5 +7.2 | 30.4 +1.2 | 43.0 +3.2 | 45.6 +5.2 | 42.7 +2.7 | 37.7 +3.8 | 40.7 +2.7 | 44.3 +3.8 | 42.4 +3.9 | 35.1 +2.1 |
| C₄'s, Percent vol | 14.9 −0.2 | 15.2 −2.1 | 11.5 −1.5 | 5.5 | 14.3 −0.1 | 13.2 −1.6 | 14.0 −0.5 | 9.5 −1.6 | 13.4 0.0 | 13.9 −0.9 | 12.2 −1.4 | 10.5 −0.1 |
| Dry Gas, Percent wt | 6.1 −1.3 | 6.8 −1.5 | 2.6 −3.9 | 3.6 | 6.2 −1.9 | 5.8 −1.5 | 6.2 −1.0 | 4.4 −1.3 | 5.8 −0.9 | 5.9 −1.4 | 5.5 −1.3 | 4.6 −0.9 |
| Coke, Percent wt | 2.2 −1.7 | 3.5 −1.5 | 2.2 −0.9 | 1.0 | 1.9 −1.8 | 2.6 −1.2 | 2.7 −1.0 | 2.1 −0.4 | 2.0 −1.3 | 2.9 −0.9 | 2.5 −0.9 | 1.9 −0.5 |
| Conv. at 0.2 SF² | 62.1 | 67.9 | 50.7 | 31.0 | 59.6 | 60.8 | 57.2 | 42.9 | 56.9 | 59.9 | 55.0 | 41.5 |
| Steam Treatment, 24 hrs., 15 p.s.i.g. (° F) | 1,200 | 1,200 | 1,200 | 1,200 | 1,200 | 1,200 | 1,200 | 1,200 | 1,200 | 1,200 | 1,200 | 1,200 |
| Physical Properties: | | | | | | | | | | | | |
| Packed Density, g./cc | 0.49 | 0.49 | 0.49 | 0.49 | 0.46 | 0.46 | 0.46 | 0.46 | 0.48 | 0.48 | 0.48 | 0.48 |
| Crystallinity, Percent | 7.7 | 7.7 | 7.7 | 7.7 | | | | | | | | |
| Catalytic Results: | Δ¹ | Δ¹ | Δ¹ | Δ¹ | Δ¹ | Δ¹ | Δ¹ | Δ¹ | Δ¹ | Δ¹ | Δ¹ | Δ¹ |
| Conversion, Percent, vol | 48.6 | 48.6 | 48.6 | 48.6 | 35.6 | 35.6 | 35.6 | 35.6 | 38.4 | 38.4 | 38.4 | 38.4 |
| C₅+Gaso., Percent vol | 39.9 +3.9 | 39.9 +3.9 | 39.9 +3.9 | 39.9 +3.9 | 29.1 +1.0 | 29.1 +1.0 | 29.1 +1.0 | 29.1 +1.0 | 31.3 +1.5 | 31.3 +1.5 | 31.3 +1.5 | 31.3 +1.5 |
| C₄'s, Percent vol | 11.5 −7.4 | 11.5 −0.7 | 11.5 −0.7 | 11.5 −0.7 | 7.6 −0.3 | 7.6 −0.3 | 7.6 +0.3 | 7.6 −0.3 | 8.6 −0.2 | 8.6 −0.2 | 8.6 −0.2 | 8.6 −0.2 |
| Dry Gas, Percent wt | 4.9 −1.3 | 4.9 −1.3 | 4.9 −1.3 | 4.9 −1.3 | 3.9 −0.5 | 3.9 −0.5 | 3.9 −0.5 | 3.9 −0.5 | 4.2 −0.6 | 4.2 −0.6 | 4.2 −0.6 | 4.2 −0.6 |
| Coke, Percent wt | 1.3 −1.6 | 1.3 −1.6 | 1.3 −1.6 | 1.3 −1.6 | 1.6 −1.0 | 1.6 −0.0 | 1.6 −0.0 | 1.6 −0.0 | 1.5 −0.3 | 1.5 −0.3 | 1.5 −0.3 | 1.5 −0.3 |
| Conv. at 0.2 SF² | 51.9 | 51.9 | 51.9 | 51.9 | 39.3 | 39.3 | 39.3 | 39.3 | 41.7 | 41.7 | 41.7 | 41.7 |

¹ Delta yield: Relative to the results obtained at the same conversion with a commercial silica-alumina cracking catalyst containing 87% silica and 13% alumina.
² SF=Severity factor.

EXAMPLES 7–9

These examples were carried out in order to compare the method of the instant invention, wherein the fluid catalyst is steam treated prior to thermal treatment, with Examples 4–6 wherein no initial steam treatment was employed. The catalyst materials of Examples 1–3 were dijusted to the same cracking severity factor (SF). This severity factor is defined as follows:

$$SF = \frac{\text{weight catalyst/weight of oil}}{\text{weight hourly space velocity}}$$

The catalysts were also compared without the foregoing adjustment.

TABLE 2

| | Catalyst of Example 1: 7.5% REX, 92.5% silica-alumina matrix | | | | Catalyst of Example 2: 87% silica, 13% alumina | | | | Catalyst of Example 3: 75% silica, 25% alumina | | | |
|---|---|---|---|---|---|---|---|---|---|---|---|---|
| Pretreatment Following Spray Drying | Steamed 24 hrs., 1,200° F., 15 p.s.i.g. | | | | Steamed 24 hrs., 1,200° F., 15 p.s.i.g. | | | | Steamed 24 hrs., 1,200° F., 15 p.s.i.g. | | | |
| Thermal Treatment, 3 hrs., (° F.) | 1,350 | 1,550 | 1,650 | 1,700 | 1,350 | 1,550 | 1,650 | 1,700 | 1,350 | 1,550 | 1,650 | 1,700 |
| Physical Properties: | | | | | | | | | | | | |
| Packed Density, g./cc | 0.47 | 0.45 | 0.47 | 0.48 | 0.42 | 0.41 | 0.43 | 0.43 | 0.45 | 0.44 | 0.45 | 0.49 |
| Pore Volume, cc./g | | 0.96 | 0.90 | 0.84 | | 1.14 | 1.02 | 0.98 | | 0.91 | 0.90 | 0.87 |
| Surface Area, m.²/g | 183 | 189 | 160 | 148 | 178 | 173 | 158 | 151 | 175 | 174 | | 160 |
| Crystallinity, Percent | 9.3 | 6.8 | 1.4 | <0.3 | | | | | | | | |
| Catalytic Results: | Δ | Δ | Δ | Δ | Δ | Δ | Δ | Δ | Δ | Δ | Δ | Δ |
| Conversion, Percent vol | 48.9 | 52.5 | 42.6 | 39.3 | 35.2 | 35.5 | 37.8 | 38.6 | 37.7 | 38.3 | 40.6 | 42.1 |
| C₅+ Gaso., Percent vol | 41.0 +4.9 | 45.1 +6.8 | 35.2 +2.8 | 33.0 +2.6 | 29.9 +2.1 | 30.7 +2.7 | 31.9 +2.4 | 32.5 +2.5 | 31.5 | 32.5 +2.7 | 33.6 +2.4 | 34.4 +2.3 |
| C₄'s, Percent vol | 10.6 −1.7 | 11.0 −2.5 | 9.4 −0.8 | 8.5 −0.6 | 7.2 −0.6 | 7.2 −0.7 | 7.8 −0.8 | 7.8 −1.1 | 8.2 | 8.2 −0.6 | 8.8 −0.8 | 9.6 −0.6 |
| Dry Gas, Percent wt | 4.4 −1.8 | 4.9 −1.9 | 4.3 −1.0 | 3.9 −1.0 | 3.7 −0.6 | 3.5 −0.9 | 3.8 −0.9 | 4.0 −0.8 | 4.0 | 3.8 −0.9 | 4.3 −0.8 | 4.5 −0.8 |
| Coke, Percent wt | 2.3 −0.6 | 1.2 −2.1 | 1.4 −0.9 | 1.4 −0.5 | 1.0 −0.5 | 1.1 −0.4 | 1.2 −0.6 | 1.4 −0.5 | 1.2 | 1.3 −0.5 | 1.5 −0.6 | 2.0 −0.2 |
| Conv. at 0.2 SF | 51.9 | 56.8 | 45.6 | 42.6 | 39.9 | 40.5 | 42.1 | 42.9 | 41.6 | 42.3 | 44.6 | 45.3 |

Consideration of results in Examples 4–9

Figure 3:
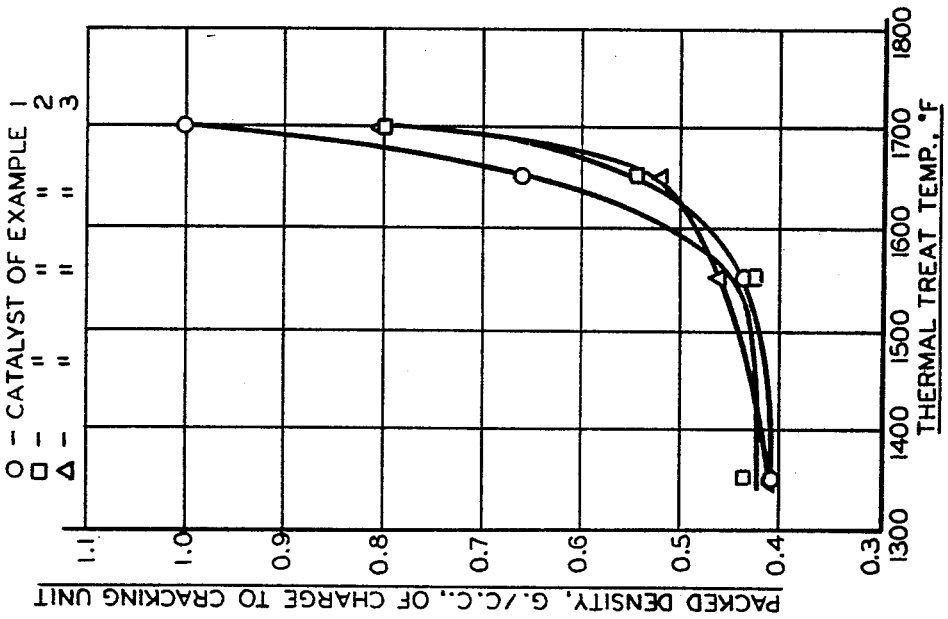
FIG. 3 is a plot of packed density as against thermal activation temperature for fluid catalysts not subjected to an intial steaming treatment.

Referring to Table 1, it will be noted that the activity, as measured by the percent conversion for the fluid catalysts (none of which had been subjected to an initial steaming treatment) decreased rapidly when the temperature of thermal treatment was greater than about 1550° F. This is also shown by a consideration of FIGS. 1 and 2 wherein the percent conversion as against temperature of thermal activation treatment is plotted. (The plot in FIG. 1 is with the data corrected to a severity factor of 0.2. In FIG. 2, the plot is for the data as is, without making this correction.) This same trend is also shown by a consideration of the packed density data, which shows a marked increase at thermal treating temperatures above 1550° F., and of the surface area data, which show a corresponding sharp decrease in surface area above 1550° F. See Table 1 and also FIGS. 3 and 4, wherein the data for density and surface area appearing in FIG. 1 are presented in graph form.

Figure 5:
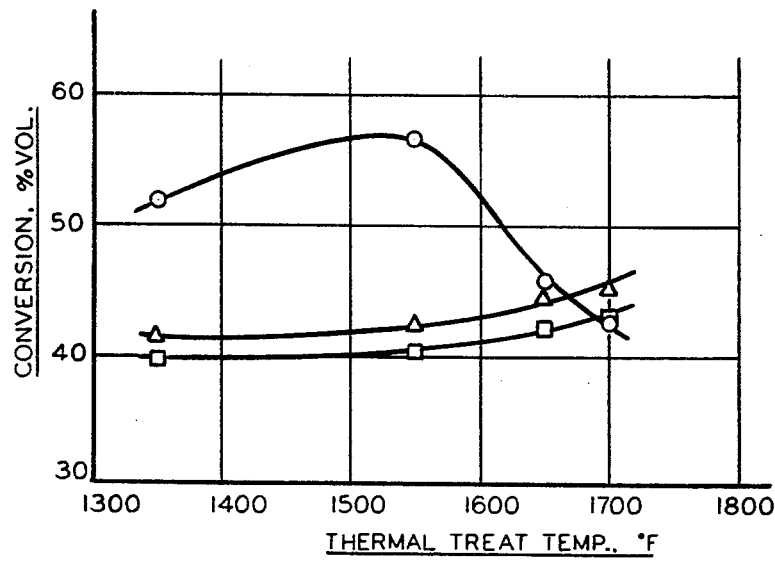
FIG. 5 is a graph of percent conversion as against temperature of thermal activation for fluid catalysts which were subjected to an initial steaming treatment in accordance with this invention, the data plotted having been corrected to a severity factor of 0.2.
Figure 6:
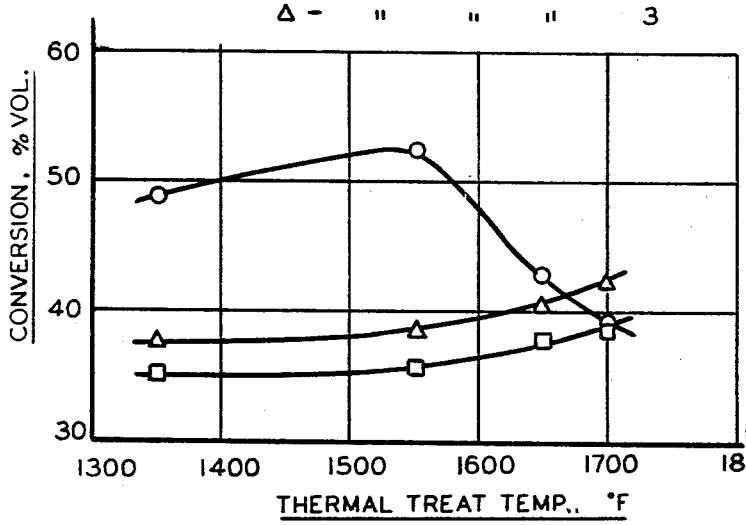
FIG. 6 is a plot similar to that of FIG. 5, the data having not been corrected to a 0.2 severity factor.

A consideration of the data in Table 2, wherein the catalysts were subjected to an initial steaming prior to thermal treatment, shows that at thermal treatment temperatures above 1550° F. the catalytic activity, as measured by the percent conversion, did tend to decrease, but much less drastically, in that the percent conversions were markedly higher (FIG. 5) than the corresponding percent conversions for similar catalysts not subjected to an initial steaming treatment (FIG. 1). See also FIGS. 5 and 6, wherein the percent conversion for the initially steamed catalysts is plotted against the thermal treatment temperature, FIG. 5 showing the data as corrected to a severity factor of 0.2, FIG. 6 showing the data without such correction. The improvement in thermal resistance is clearly shown by comparing FIGS. 5 and 6 with FIGS. 1 and 2, respectively.

Figure 7:
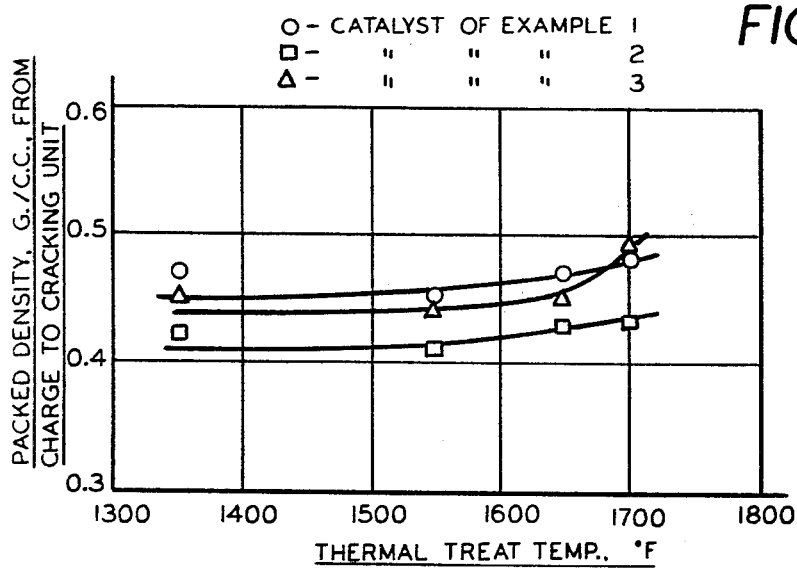
FIG. 7 is a plot of packed density as against thermal activation temperature for fluid catalysts which were subjected to an initial steaming treatment.
Figure 8:
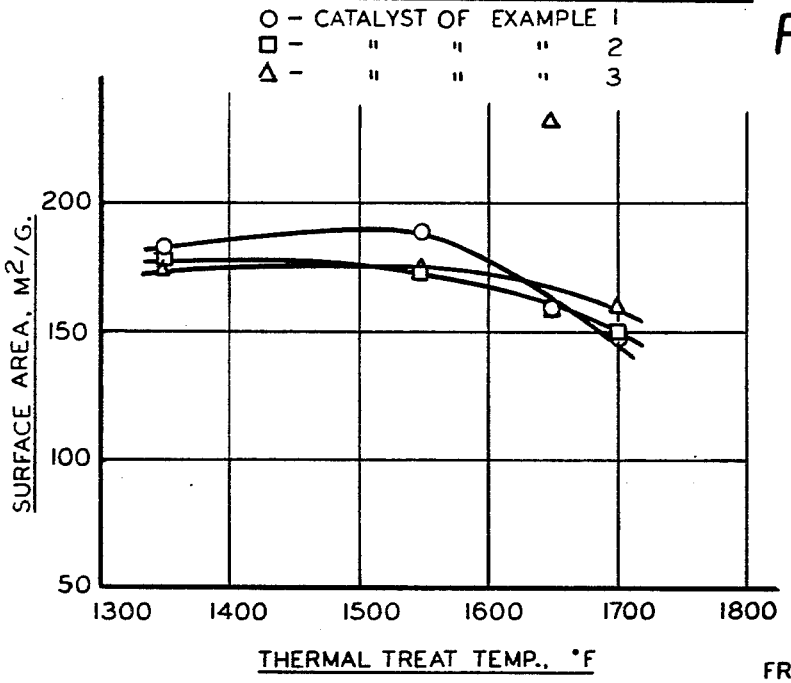
FIG. 8 is a plot of surface area as against thermal activation temperature for fluid catalysts which were subjected to an initial steaming treatment, the data plotted having been corrected to a severity factor of 0.2.

The foregoing trend is also shown by a consideration of the data for (1) packed density, which increased less for the initially steamed catalysts (Table 2) as the temperature of thermal treatment increased than did the density of the corresponding unsteamed catalysts (Table 1), and (2) surface area, which decreased less for the initially steamed catalysts (Table 2) than did the surface area for the unsteamed catalysts (Table 1). The changes in density and in surface area, respectively, for the steamed catalysts, plotted against temperature of thermal activation, are also shown in FIGS. 7 and 8, which can be compared with corresponding FIGS. 3 and 4 for the unsteamed catalysts.

The foregoing data clearly shows that by subjecting the fluid catalysts to an initial steaming treatment prior to thermal treatment, the catalysts are rendered more thermally resistant in that thermal treatment, particularly at temperatures in excess of 1550° F., has much less effect in decreasing the catalytic activity of such catalysts than it does with catalysts not preliminarily steamed.

It is of particular interest to compare the catalytic performance data for catalysts which are first steamed and then thermally treated with catalysts wherein the sequence is reversed and the catalysts are first thermally treated and then steamed. Referring to Table 1 and the cracking data given for those catalysts after first thermally treating for three hours at 1550° F. and then steaming for 24 hours at 1200° F. with 100 percent steam at 15 p.s.i.g., and comparing this data with the data in Table 2 for those catalysts first steamed for 24 hours at 1200° F. with 100 percent steam at 15 p.s.i.g. and then thermally treated for 3 hours at 1550° F., it will be noted that in each instance the latter catalysts showed catalytic selectivities superior to those of the former catalysts. This is particularly shown by a consideration of the delta yields for $C_5$'s plus gasoline. Thus, comparing the catalyst of Example 1 (a) wherein it was first thermally treated for three hours at 1550° F. and then steamed for 24 hours at 1200° F. and 15 p.s.i.g. and (b) wherein it first was steamed for 24 hours at 1200° F. and 15 p.s.i.g. and then thermally treated for three hours at 1550° F., the delta values for $C_5$'s+gasoline are, respectively, 3.9 and 6.8. Similarly, for the catalyst of Example 2, the respective values are 1.0 and 2.7; and for the catalyst of Example 3, the respective values are 1.5 and 2.7. That is, in each instance steaming followed by thermal treatment produced an improved delta yield of $C_5$'s plus gasoline as compared to thermal treatment followed by steaming.

The catalysts prepared in accordance with the invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization and the like. The catalysts are exceptionally stable and are particularly useful in such of the above and related processes carried out at temperatures ranging from ambient temperatures of 70° F. up to 1400° F. including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000. For dehydrogenation, metals and oxides and sulfides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, chromium, iron, manganese, vanadium, copper and mixtures thereof may be used in conjunction with the aluminosilicate. Desulfurization of shale distillates and the like may be carried out at temperatures between about 600° F. and 1000° F. under atmospheric or superatmospheric pressures with a space velocity (LHSV) between 0.2 and 50. The specific conditions within these ranges will vary with the feed stock undergoing desulfurization and the product desired.

The catalysts of the invention can be employed for hydrogenation of unsaturated aliphatic hydrocarbons, such as monoolefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 1000° F. under a pressure of about 10 to 3000 pounds p.s.i. or more, at a space velocity (LHSV) from about 0.5 to 5.0. The promoters which are normally employed with the aluminosilicate include the oxides of nickel, copper and iron and platinum group metals.

Hydrocracking of heavy petroleum residual stocks, cycle stocks, etc., may be carried out with active aluminosilicates prompted with about 0.05 to 10 percent by weight of a platinum metal such as platinum, palladium, rhodium, osmimum, iridium, and ruthenium. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10.

The catalysts of the invention may be further utilized for the alkylation of aromatic hydrocarbons of phenols and the conversion of olefinic, acetylenic and naphthenic hydrocarbons. Alkylation of aromatics and phenols may be carried out at temperatures between 150 and 850° F. under pressures of 0 to 1000 p.s.i.g. The aromatizing reaction may be effected at temperatures between about 500 and 1200° F. under atmospheric or elevated pressures. Other reactions in which the catalysts find utility include isomerization, polymerization, hydrogen transfer, oxidation of olefins to form the corresponding oxide, such as ethylene to ethylene oxide, propylene to propylene oxide, etc., as well as the oxidation of alcohol and ketones, etc. The catalyst composition of the invention also finds utility in processes for the oxidation of cyclohexane to adipic acid through the precursors cyclohexanone and cyclohexanol, as well as in the manufacture of caprolactam from caprolactone and ammonia. Additionally, the catalyst composites of the invention may be useful catalytically in processes for the production of vinyl chloride by oxidative-dehydrogenation reactions involving ethane and hydrogen chloride.

It will be understood that variations can be made without departing from the spirit and scope of this invention.

Having thus described our invention, what we desire to secure and claim by Letters Patent is:

1. In a method of preparing a fluid catalyst comprising precipitating at an acidic pH of from about 4 to 5 a siliceous oxide gel in hydrous form by adding an acid, acid salt, or both, to an aqueous alkaline silicate solution, drying the resulting siliceous oxide gel in the form of finely divided particles suitable for use in fluid catalytic cracking, and thermally treating the finely divided product, the improvement comprising steaming the finely divided product prior to said thermal treatment, said steaming being carried out with at least 80 percent steam at a pressure of from about 0 to 30 p.s.i.g. at a temperature of from about 900 to 1500° F. for a time of from about 48 hours to one-half an hour, whereby the resulting catalyst is rendered resistant to loss in catalytic activity and selectivity by said thermal treatment.

2. The method of claim 1 wherein said thermal treatment is carried out by heating at a temperature of from about 1100 to 1400° F. for from about 16 to 3 hours.

3. The method of claim 2 wherein prior to said drying step there is dispersed in said siliceous oxide gel a finely divided rare earth zeolite, said gel serving as a matrix for the rare earth zeolite.

4. The method of claim 2 wherein said siliceous oxide gel is selected from the group consisting of silica, silica-alumina, silica-zirconia, and silica-zirconia-alumina.

5. The method of claim 3 wherein said siliceous oxide gel is selected from the group consisting of silica, silica-alumina, silica-zirconia, and silica-zirconia-alumina.

6. The method of claim 3 wherein said rare earth zeolite is dispersed in said silica-metal oxide gel while said gel is acidic.

7. The catalyst prepared by the method of claim 1.

8. In the catalytic cracking of a hydrocarbon oil to lower boiling hydrocarbons, the improvement comprising contacting the oil under cracking conditions with the catalyst of claim 1.

References Cited
UNITED STATES PATENTS

| | | | |
|---|---|---|---|
| 3,238,147 | 3/1966 | Cramer et al. | 252—453 |
| 3,210,267 | 10/1965 | Plank et al. | 208—120 |
| 3,257,310 | 6/1966 | Plank et al. | 208—120 |

DELBERT E. GANTZ, *Primary Examiner.*

ABRAHAM RIMENS, *Assistant Examiner.*

UNITED STATES PATENT OFFICE
CERTIFICATE OF CORRECTION

Patent No. 3,393,147                                        July 16, 1968

Francis G. Dwyer et al.

It is certified that error appears in the above identified patent and that said Letters Patent are hereby corrected as shown below:

Columns 11 and 12, TABLE 1, sixth column, line 10 thereof, "6.2 -1.9" should read -- 6.2 -0.9 --; same table, second column, line 19 thereof, "11.5 -7.4" should read -- 11.5 -0.7 --; same table, sixth column, line 21 thereof, "1.6 -1.0" should read -- 1.6  0.0 --.

Signed and sealed this 16th day of December 1969.

(SEAL)
Attest:

Edward M. Fletcher, Jr.                          WILLIAM E. SCHUYLER, JR.

Attesting Officer                                      Commissioner of Patents